June 29, 1965 D. C. TURNER 3,191,513
BELLOWS CONSTRUCTION
Filed May 6, 1963

United States Patent Office 3,191,513
Patented June 29, 1965

3,191,513
BELLOWS CONSTRUCTION
Donald C. Turner, 66 Highledge Drive, Penfield, N.Y.
Filed May 6, 1963, Ser. No. 278,346
7 Claims. (Cl. 95—39)

This invention relates to the construction of expansible and collapsible bellows, such as are used, for example, in certain types of photographic cameras, photographic enlargers, and various kinds of optical apparatus and equipment. The bellows of the present invention are not limited in usefulness, however, to photographic or optical equipment, since the present construction is useful also in bellows intended for various industrial applications not connected with photography or optics, such for example as bellows to provide an enclosed passageway between two relatively movable parts or bodies, to prevent dust or foreign matter from entering such bodies, or bellows for furnishing an expansible and contractable pneumatic chamber or vacuum chamber, or for many other industrial applications.

An object of the present invention is the provision of a generally improved and more satisfactory bellows construction.

Another object is the provision of a bellows construction which is more stable and less liable to sideways displacement or deformation than comparable bellows of the prior art.

A further object is the provision of an improved method of making bellows.

These and other desirable objects may be attained in the manner disclosed as an illustrative embodiment of the invention in the following description and in the accompanying drawings forming a part hereof, in which.

As well understood in the art of bellows manufacture, a collapsible bellows, whether for optical or other purposes, usually comprises two layers of flexible sheet material, with a stiffening skeleton between the two sheets. The stiffening skeleton holds the folds or pleats of the bellows in proper position and determines the fold lines of the sheet material. When the bellows are to be used for optical purposes (for example, in a photographic camera or a photographic enlarger) one or both of the sheets of sheet material are of opaque material, the outer layer frequently being of thin and flexible leather, or of an artificial leather substitute, the inner layer frequently being of opaque black cloth or some opaque synthetic sheet material. When the bellows are not to be used in any optical apparatus, so that there is no need for an opaque construction, both layers of sheet material can be and frequently are transparent, made for example of transparent plastic sheeting. In any event the layers of sheet material are, of course, flexible so that they can be folded along the proper fold lines in order to allow the bellows to expand and contract in the familiar manner.

The stiffening skeleton itself may be of sizing material applied by a stencil to one of the layers of sheet material (see, for example, Turner Patent 2,578,111, granted December 11, 1951) but usually and preferably the stiffening skeleton is made of stiff paper or thin card stock, quite similar (except for certain features of shape, which constitute the novel improvement of the present structure) to the stiffening skeletons well known and customarily used in the art. Other materials which may be used for the stiffening skeleton are thin metal sheeting, metal foil, stiff plastic sheeting, or indeed any kind of sheet material which is appreciably stiffer than the layers of sheet material which form the main walls of the bellows.

Figure 2:
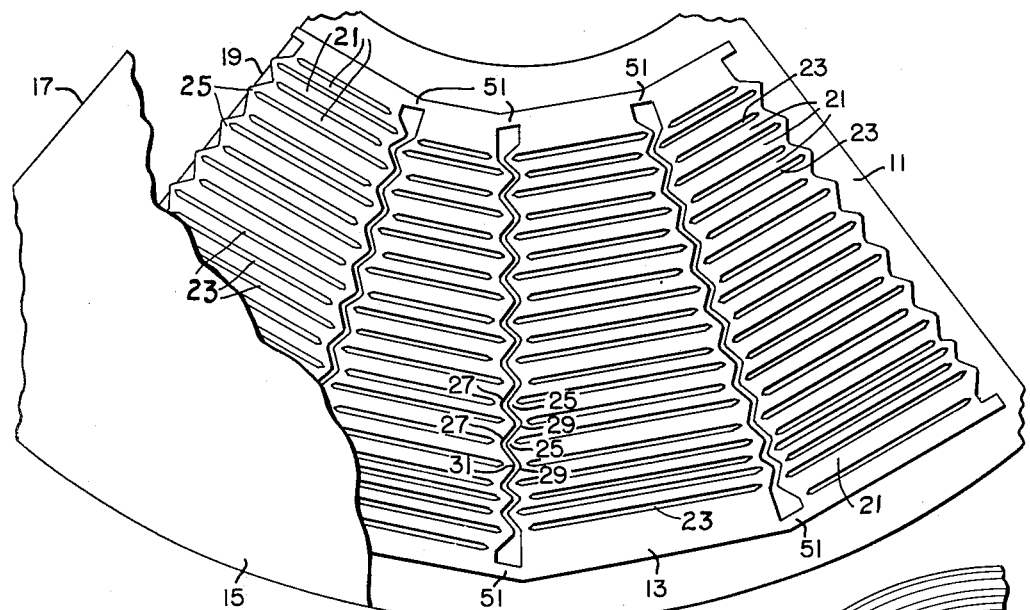
FIG. 2 is a plan of the bellows shown in FIG. 1 in an intermediate stage of manufacture, showing particularly the shape of the stiffening skeleton.

Referring now to the drawings, there is shown in FIG. 2 a portion of a bellows in flat form at an early stage of manufacture. The first layer of sheet material, for example, the layer which will ultimately form the lining or inner face of the bellows, is shown at 11. The stiffening skeleton or framework, indicated in general at 13, is applied to the layer 11 and held thereon by means of suitable cement of known form. Then on top of the layer 11 and skeleton 13, the second layer of sheet material 15 is applied and held in place by cement. Usually one edge 17 of the outer layer 15 projects a substantial distance beyond the corresponding edge 19 of the first layer 11, so that when the opposite edges are brought around to form a hollow tubular body, the seam in the inner layer 11 will come at a different place from the seam in the outer layer 15, this being well understood in the art.

The characteristic feature or novel feature of the present skeleton, distinguishing it from generally similar stiffening skeletons in the prior art, is the feature of the shape of the skeleton at the edges where two adjacent sides of the bellows meet each other. It does not matter how many sides the bellows may have. Since four-sided bellows are used to a greater extent than those of other shapes, the drawings illustrate a four-sided bellows, but the same principles of the invention can be used in bellows having six, eight, or more sides. Likewise it is immaterial for purposes of the present invention whether the bellows are tapered to be smaller at one end than the other, as is customary in many syles of photographic cameras, or whether the bellows are of uniform cross section throughout their entire length, such bellows being used in various other fields as well as in certain types of cameras.

In any event, regardless of number of sides of bellows and whether tapered or straight, the important feature is that at the meeting line where two adjacent sides of the bellows meet each other, the stiffening skeleton is formed with projections which may be said to "interlock" with each other, in a manner which will be understood by those skilled in the art.

Referring now to the stiffening skeleton 13 shown in FIG. 2, it is seen that this comprises, along the portions of the sheet material which are to form each separate side of the bellows, a series of strips 21, separated from each other by slits 23, the slits coming at the points where there will be fold lines in the completed bellows. In the prior art, the stiffening skeleton on each side of the bellows has terminated substantially short of a line drawn along the closest part or a plane containing the bottoms of the troughs of the next adjacent side of the bellows, with no overlapping or interlocking whatsoever. According to the present invention, however, a much more sturdy bellows, and one which is much more rigid against lateral deflection or deformation, is provided by making the stiffening skeleton on each side of the bellows with edges which are zigzag, having points projecting into the notches or spaces between corresponding points on the adjacent side of the bellows.

For example, again referring to FIG. 2, there are points 25 on the stiffening skeleton on one side of the bellows, which project into notches 27 of the next adjacent side of the bellows, and notches 29 on the first mentioned side which receive points 31 on the second side of the bellows.

As well understood by those familiar with bellows construction, when the bellows is creased to form the fold lines of the pleats, the outwardly projecting fold on one side of the bellows comes opposite the inwardly projecting fold of the next adjacent sides of the bellows. The extreme lateral edges of each side of the bellows, beyond a line drawn along the innermost points of the zigzag fold line, or beyond a plane containing the bottoms of the troughs or grooves of the pleats of the adjacent side of the bellows, have heretofore had no support or stiffening except the inherent stiffness of the sheet material itself. This has resulted in bellows which are quite susceptible to lateral deformation or collapse; that is, lateral collapse from a square cross section to a parallelogram cross section. But with the points 25 and 31 on two adjacent sides of the bellows extending into the notches or spaces 27 and 29, so that the stiffening skeleton on one side interlocks effectively with the stiffening skeleton of the next adjacent side of the bellows, there is greatly enhanced resistance against lateral collapse or deformation of this kind. Thus, utilizing the present invention, it is now found possible to construct bellows of large size which are relatively stable against lateral deflection or inward collapse, and which can even be used with a moderate amount of partial vacuum or sub-atmospheric pressure as required in certain industrial applications, where bellows made according to the prior art were not satisfactory.

In prior bellows where there were no such points and notches on the stiffening elements or skeletons of adjacent sides of the bellows, it has been customary, after completing the cementing of the layers as in FIG. 2, to bring the opposite edges of the sheet material together and cement the edges, and then to fold the corners of the bellows temporarily along straight fold lines, and roll the bellows under moderate pressure to a sufficient degree so that the pattern of the stiffening skeleton between the layers of sheet material would show through the outer layer, to enable easier folding of the accordion pleats of the bellows during the subsequent manual folding operation. This prior practice of temporarily making straight folds at the corners or edges between adjacent sides of the bellows, is not possible with bellows constructed according to the present invention, without so bending the projecting points of the stiffening skeleton as to destroy partially their usefulness. Hence, according to the present invention, a different assembly and completion method is used.

Figure 3:
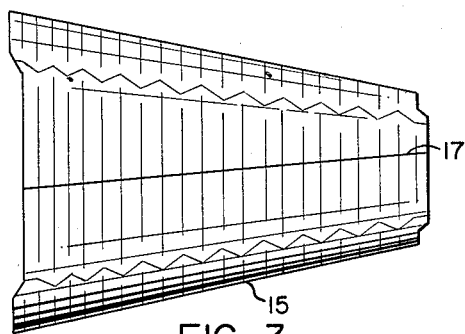
FIG. 3 is a side elevation of bellows at a further intermediate stage of manufacture.
Figure 4:
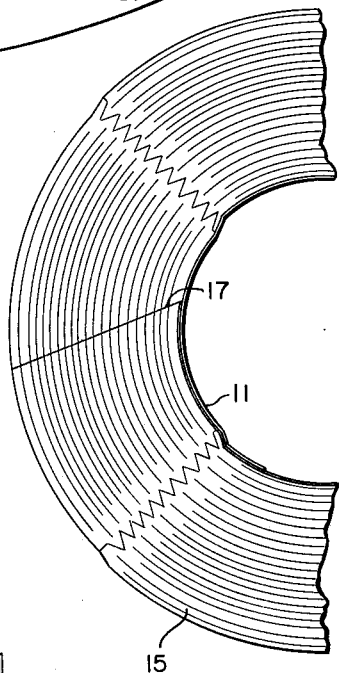
FIG. 4 is an end view of the bellows at the stage of manufacture shown in FIG. 3, viewed from the smaller end, and on a larger scale than FIG. 3.

Since there is no straight line along which the present bellows can be folded at the corners or edges between adjacent sides, the bellows are first formed into a shape having an approximately circular cross section, as seen in side elevation in FIG. 3, and fragmentarily in end view in FIG. 4. This has the effect of slightly curving each side of the bellows and producing slight curvature in the projecting points 25, 31 of the stiffening skeleton, but the radius of curvature is so great that the stiffening material or skeleton is not deformed beyond its elastic limit, and no permanent damage results. The bellows, while shaped to this circular cross section is then placed between two rollers which extend in the direction of the axis of the bellows, and is rolled in a circumferential direction, with sufficient pressure to cause the pattern of the stiffening skeleton to appear faintly through the outer layer of sheet material. If the bellows is of uniform cross sectional dimensions throughout its length, cylindrical rollers are used, and if the bellows is tapered, smaller at one end than the other, conical rollers are used.

Upon removal from the rollers, the bellows are folded by hand to form the accordion pleats, this folding operation being aided by the previous rolling operation which has caused the pattern to appear through the outer layer of sheet material, so that the operator knows just where to make the folds when forming the accordion pleats. As the pleating or folding progresses from one end of the bellows toward the other, the bellows assumes the intended polygonal cross sectional shape, instead of the circular cross sectional shape which it had during and immediately following the rolling opertion. Upon completion of the pleating operation, a typical bellows of rectangular cross section will have the final appearance shown in FIG. 1. When the pleating is completed, the usual front and back frames (not shown) are applied to the bellows in the usual conventional manner.

Figures 1, 5:
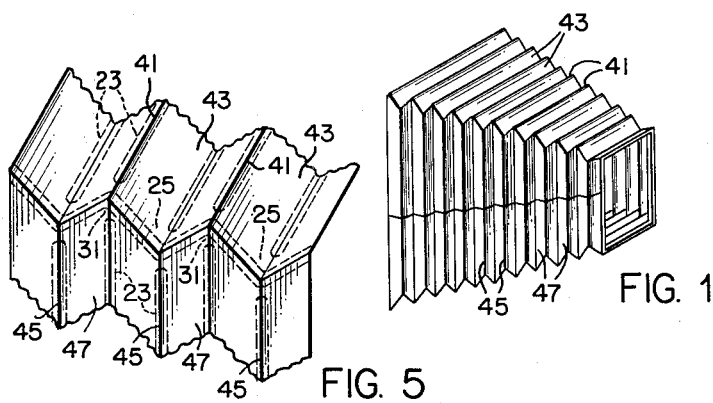
FIG. 1 is a perspective view of one typical form of bellows constructed in accordance with the present invention.
FIG. 5 is a perspective view of a fragment of a corner of the bellows construction on a considerably enlarged scale, to illustrate the interlocking of the stiffening skeleton parts at the corner.

Referring now to FIG. 5, there is here shown a small fragment of a corner of the bellows, on an enlarged scale. The pattern of the stiffening frame or skeleton is shown in dotted lines. On one side of the bellows (the upper side as shown in FIG. 5) there will be, at the completion of the pleating operation, a series of ridges 41 separated by troughs 43. On the next adjacent side of the bellows (the lower side as shown in FIG. 5) there will be a series of ridges 45 separated by troughs 47. It will be noted that, as already briefly mentioned above, the ridges 41 of the first side come opposite the troughs 47 of the second side, and the ridges 45 of the second side come opposite the troughs 43 of the first side. The projecting portions or points 25 of the stiffening skeleton on the first side project out beyond the bottoms of the troughs 47 in the second side, as well seen in FIG. 5, and the projecting points 31 of the second side project beyond the bases or fold lines of the troughs 43 of the first side. If one can visualize a plane containing the bottoms of all the grooves or troughs 47 of the second side, it will be appreciated that the points 25 of the stiffening skeleton of the first side project through and laterally beyond such plane. Similarly, the points 31 of the stiffening skeleton of the second side project laterally through and beyond a plane containing the bottoms of the grooves or troughs 43 of the first side. Thus there is what may be called an interlocking of the stiffening skeleton on one side of the bellows with the stiffening skeleton of the next adjacent side, with the result of greatly increased lateral stability, as above mentioned.

Referring again for a moment to FIG. 2, it is seen that the portion of the stiffening skeleton which is to form one side of the bellows is connected to the portion of the stiffening skeleton which is to form the next adjacent side, by narrow connecting strips 51 at the front and back ends of the bellows. Such connecting strips are known in the prior art, and are simply intended to keep the various parts of the stiffening skeleton in proper relation to each other while being cemented in place on the sheet material. These narrow connecting strips 51 are so small that they offer no appreciable resistance to the desired folding at the corners of the bellows.

When one considers the action of the folds of the bellows during longitudinal or axial expansion and contraction, it is obvious that the grooves or troughs of the pleats are sometimes deeper and sometimes shallower, depending upon upon the degree of expansion or extension of the bellows. If the points 25 and 31 of the stiffening skeleton are made too long, they will interfere with extreme extension or stretching of the bellows. But in good practice, bellows should not be extended to the ultimate possible length, and the present invention is intended for use with bellows designed for only moderate extension to a position wherein the pleats are not nearly flattened but still have troughs of moderate depth. If it is necessary, on special occasions, to stretch the bellows beyond the normal maximum extension for which the zigzag edges of the stiffening skeleton are designed, the points of the skeleton will simply have to give or bend a little, and of course there is some give in the portions of the sheet material which bridge the gap between the adjacent zigzag edges of the stiffening skeleton.

It is seen from the foregoing disclosure that the objects and purposes of the invention are well fulfilled. It is to be understood that the foregoing disclosure is given by way of illustrative example only, rather than by way of limitation, and that without departing from the invention, the details may be varied within the scope of the appended claims.

What is claimed is:

1. An expansible bellows comprising a plurality of sides together forming a hollow body of polygonal cross section expansible and contractable in an axial direction, each side having a plurality of pleats forming successive ridges and grooves, with the ridges of one side substantially alined with the grooves of an adjacent side, each ridge and groove being formed by approximately flat plane surfaces and having stiffening material tending to keep said surfaces approximately flat and plane, characterized by the fact that the stiffening material for at least certain of said flat surfaces on two adjacent sides of the bellows has inclined ends which are longer near the bottoms of the grooves than near the tops of the ridges, the inclined ends of the stiffening material on one side of the bellows projecting beyond a plane containing the bottoms of the grooves of the next adjacent side of the bellows.

2. An expansible bellows comprising a plurality of sides each lying in a general plane at an angle to the next adjacent side, each side being pleated to form a plurality of folds having ridges and troughs extending transversely to the angle between two adjacent sides, the portion of each side between the top of one ridge and the next succeeding trough bottom having stiffening material which, at the ends of the trough, projects substantially beyond a plane containing the bottoms of the troughs of the next adjacent side of the bellows, so that the projecting parts of the stiffening material on one side of the bellows tend to interlock with the corresponding projecting parts of the stiffening material on the next adjacent side of the bellows, to give the bellows increased stability against lateral collapse.

3. A construction as defined in claim 2, in which each side of the bellows includes two layers of flexible sheet material, and in which said stiffening material is interposed between the two layers of sheet material.

4. A construction as defined in claim 2, in which each side of the bellows includes two layers of flexible sheet material, and in which said stiffening material is formed of a stiffening skeleton of stiff paper-like material interposed between the two layers of sheet material.

5. A construction as defined in claim 4, in which the stiffening skeleton for one side of the bellows and the stiffening skeleton for the next adjacent side of the bellows, when laid flat in a common plane, have adjacent edges of zigzag shape with the points of the zigzag edge of one stiffening skeleton extending partly into the notches of the zigzag edge of the next adjacent stiffening skeleton.

6. A stiffening skeleton for two adjacent sides of a collapsible bellows having a plurality of sides and having a series of transverse pleats in each side, said skeleton having one portion for stiffening one side of the bellows and another portion for stiffening an adjacent side of the bellows, each portion of said skeleton being formed of stiffening material having a series of transverse slots in locations corresponding to the transverse fold lines of the pleats in the completed bellows, characterized by the fact that the lateral edges of the respective portions of the skeleton are of zigzag shape and that in the original flat form of the stiffening skeleton the points of the zigzag edge of one portion of the skelton extend partly into the notches of the zigzag edge of the next adjacent portion of the skeleton.

7. The method of making a collapsible bellows having a plurality of pleated sides which comprises the steps of providing a layer of flexible sheet material, affixing to said sheet material a stiffening skeleton having one portion for stiffening one side of the bellows and another portion for stiffening another side of the bellows adjacent to the first side, the adjacent edges of the two portions of the stiffening skeleton being of zigzag shape with the points of the zigzag edge of one portion of the skeleton extending partly into the notches of the zigzag edge of the next adjacent portion, forming the sheet material with the stiffening skeleton affixed thereto into a tubular body of approximately circular cross section, rolling the tubular body between a roller within the tubular body and another roller exterior thereto with sufficient pressure to cause the pattern of the stiffening skeleton to become visible on the exterior face of the tubular body, and pleating the tubular body with transverse pleats following the pattern of the stiffening skeleton and simultaneously transforming the circular cross sectional shape of the body to a polygonal cross sectional shape as the pleating operation progresses.

References Cited by the Examiner

UNITED STATES PATENTS

| | | | |
|---|---|---|---|
| 1,382,081 | 6/21 | Heiliger | 29—454 |
| 1,500,391 | 7/24 | Hutchings | 95—39 |

NORTON ANSHER, *Primary Examiner.*

JOHN M. HORAN, *Examiner.*